(12) United States Patent
Wolfgarten

(10) Patent No.: US 9,021,651 B2
(45) Date of Patent: May 5, 2015

(54) WIPER DEVICE, IN PARTICULAR A MOTOR VEHICLE WINDSHIELD WIPER DEVICE

(75) Inventor: Sven Wolfgarten, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/976,606

(22) PCT Filed: Nov. 22, 2011

(86) PCT No.: PCT/EP2011/070647
§ 371 (c)(1),
(2), (4) Date: Jun. 27, 2013

(87) PCT Pub. No.: WO2012/089411
PCT Pub. Date: Jul. 5, 2012

(65) Prior Publication Data
US 2013/0269139 A1  Oct. 17, 2013

(30) Foreign Application Priority Data
Dec. 27, 2010  (DE) .......................... 10 2010 064 178

(51) Int. Cl.
*B60S 1/34* (2006.01)
*B60S 1/52* (2006.01)
*B60S 1/40* (2006.01)
*B60S 1/32* (2006.01)
*B60S 1/38* (2006.01)

(52) U.S. Cl.
CPC .. *B60S 1/524* (2013.01); *B60S 1/32* (2013.01); *B60S 1/3497* (2013.01); *B60S 1/38* (2013.01); *B60S 1/522* (2013.01)

(58) Field of Classification Search
CPC ...... B60S 1/3415; B60S 1/3497; B60S 1/522; B60S 1/524; B60S 1/52; B60S 1/38; B60S 1/32; B60S 1/0469
USPC ............. 15/250.04, 250.32, 250.351, 250.43, 15/250.44, 250.361, 250.31
See application file for complete search history.

(56) References Cited

U.S. PATENT DOCUMENTS

| 5,987,695 A * | 11/1999 | Edele et al. ................. | 15/250.04 |
| 6,463,621 B1 * | 10/2002 | Zimmer et al. ............ | 15/250.04 |
| 6,934,992 B2 * | 8/2005 | Sato ........................... | 15/250.04 |
| 7,506,400 B2 * | 3/2009 | Zimmer ..................... | 15/250.04 |

FOREIGN PATENT DOCUMENTS

| CN | 1513711 | 7/2004 |
| DE | 3744237 | 7/1989 |
| DE | 10031417 | 1/2002 |
| DE | 10210720 | 10/2003 |

(Continued)

OTHER PUBLICATIONS

International Search Report for Application No. PCT/EP2011/070647 dated Feb. 13, 2012 (3 pages).

*Primary Examiner* — Gary Graham
(74) *Attorney, Agent, or Firm* — Michael Best & Friedrich LLP

(57) ABSTRACT

The invention relates to a wiper device, comprising a wiper arm (10a; 10b) and an inner circle guide unit (14a; 14b) having an inner circle guide element (16a; 16b) for guiding a wiper blade (12a; 12b). According to the invention, the inner circle guide unit (14a; 14b) has at least one nozzle element (18a; 18b) for spraying washing water onto a motor vehicle windshield (20a).

18 Claims, 4 Drawing Sheets

(56) References Cited

FOREIGN PATENT DOCUMENTS

| | | |
|---|---|---|
| EP | 0591062 | 4/1994 |
| EP | 0731009 | 9/1996 |
| EP | 0845395 | 6/1998 |
| JP | 3-13256 | 2/1991 |
| JP | 6-33763 | 5/1994 |
| JP | 2002067886 | 3/2002 |
| JP | 2002308064 | 10/2002 |
| JP | 2002536244 | 10/2002 |
| JP | 2003025968 | 1/2003 |
| JP | 2007112392 | 5/2007 |
| JP | 2008546596 | 12/2008 |
| KR | 1019990010802 | 2/1992 |
| KR | 1019980023084 | 7/1998 |

* cited by examiner

WIPER DEVICE, IN PARTICULAR A MOTOR VEHICLE WINDSHIELD WIPER DEVICE

BACKGROUND OF THE INVENTION

A wiper device comprising a wiper arm and an inner circle guide unit having an inner circle guide element for guiding a wiper blade is already known from the motor vehicle windshield wiper device sector. Furthermore, nozzle elements for spraying washing water onto a motor vehicle windshield are known.

SUMMARY OF THE INVENTION

The invention is based on a wiper device comprising a wiper arm and an inner circle guide unit which is arranged on the wiper arm and has an inner circle guide element for guiding a wiper blade.

It is proposed that the inner circle guide unit has at least one nozzle element for spraying washing water onto a motor vehicle windshield, the washing water thereby being able to be sprayed particularly closely onto a wiper blade and/or operating costs of the wiper device being able to be reduced. In this context, an "inner circle guide unit" is intended to be understood in particular as meaning a unit which is provided for guiding a free, inner wiper blade end of a wiper blade along an inner circular trajectory of the inner circle guide unit in an operating state. In this context, a "free, inner wiper blade end" is intended to be understood in particular as meaning an end of a component, which end points toward a wiper device rotational center about which the wiper device rotates in an operating state. An "inner circular trajectory" in this context is intended to be understood in particular as meaning a circular trajectory which is in the form of an arc of a circle and along which the inner circle guide unit moves in an operating state. The inner circular trajectory preferably has a center point which is arranged in the rotational center about which the wiper device rotates in an operating state. In this context, an "inner circle guide element" is intended to be understood in particular as meaning an element which is provided for coupling a free wiper blade end of a wiper blade to the wiper arm. In this context, a "nozzle element" is intended to be understood in particular as meaning an element which is provided for spraying a liquid, such as, in particular, washing water for cleaning a motor vehicle windshield, in a certain spraying direction. The nozzle element preferably has a connecting element for the connection of a washing water tube.

In a further refinement of the invention, it is proposed that the nozzle element has a spraying direction which extends substantially radially to an inner circular trajectory of the wiper blade, as a result of which a particularly uniform distribution of washing water over a motor vehicle windshield can be achieved. In this context, "substantially" is intended to be understood in particular as meaning a deviation of less than 20°, preferably less than 10°.

Furthermore, it is proposed that the nozzle element is formed in one piece with the inner circle guide element, thus enabling a stable connection to be achieved while avoiding further components. "In one piece" is intended to be understood in particular as meaning in an integrally bonded manner, such as, for example, by means of a welding process and/or adhesive bonding process, etc., and, particularly advantageously, integrally formed, such as by means of production from a casting and/or by means of production in a single- or multi-component injection molding process.

A particularly rapid and simple connection of the inner circle guide unit with the wiper arm can be achieved if the inner circle guide unit has at least one latching means which is provided for forming a latching connection with the wiper arm. In this context, a "latching means" is intended to be understood in particular as meaning a spring-elastic means for producing a latching connection, said means being provided so as to be deflected elastically during installation.

Furthermore, it is proposed that the inner circle guide element has a guide recess which is provided for receiving a wiper blade in a form-fitting manner, thus enabling a particularly reliable and structurally simple guiding of the wiper blade by the inner circle guide unit to be achieved.

In a further refinement of the invention, it is proposed that the nozzle element is arranged behind the guide recess, as viewed in a first wiping direction. The nozzle element is preferably arranged at least over a large part of a wiping region in a wind shadow of the wiper arm and/or of a wiper blade when an airstream strikes against the wiper device. In this context, a first wiping direction is intended to be understood in particular as meaning a direction of movement of the inner circle guide unit out of an inoperative position. An "inoperative position" in this context is intended to be understood in particular as meaning a wiper device position in which said wiper device at least remains outside an operating state and/or in a deactivated state.

It is furthermore proposed that the inner circle guide unit has at least one second nozzle element, thus enabling a wiping capacity of the wiper device to be increased in a simple manner.

If the at least one second nozzle element is arranged in front of the guide recess, as viewed in a first wiping direction, the motor vehicle windshield can advantageously be wetted with washing water on both sides, as viewed from the wiper blade.

BRIEF DESCRIPTION OF THE DRAWINGS

Further advantages emerge from the description below of the drawing. The drawing illustrates two exemplary embodiments of the invention. The drawings, the description and the claims contain numerous features in combination. A person skilled in the art will expediently also consider the features individually and put them together to form meaningful further combinations.

In the drawings.

DETAILED DESCRIPTION

Figure 1:
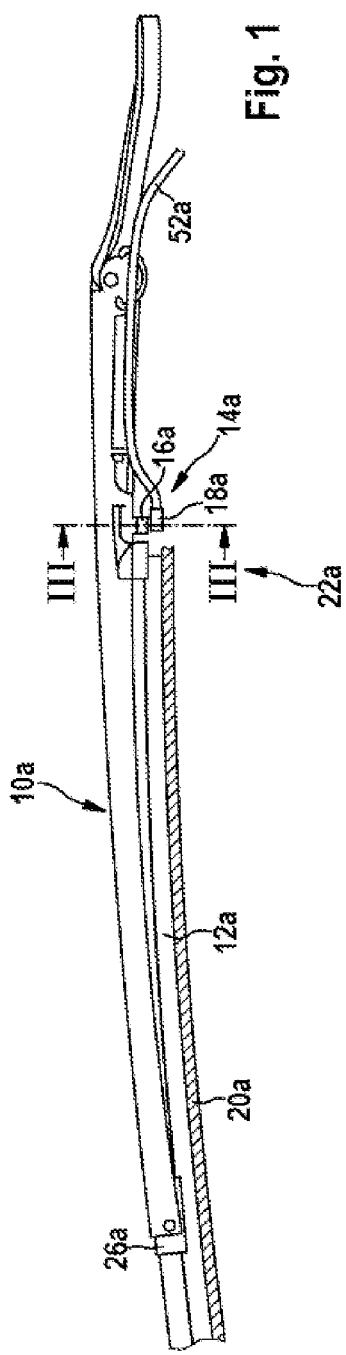
FIG. 1 shows a side view of a wiper device according to the invention with a wiper blade.

FIG. 1 shows a wiper device according to the invention comprising a wiper arm 10a and an inner circle guide unit 14 arranged on the wiper arm 10a. The inner circle guide unit 14a comprises an inner circle guide element 16a for guiding a wiper blade 12a. Furthermore, the inner circle guide unit 14a has a nozzle element 18a for spraying washing water onto a motor vehicle windshield 20a. The wiper blade 12a is connected to the wiper arm 10a in a manner familiar to a person skilled in the art via a wiper blade adapter 26a. A washing water tube 52a, through which washing water flows during a cleaning operation, is fastened to the nozzle element 18a.

The nozzle element 18a is formed in one piece with the inner circle guide element 16a in an injection molding process. However, in this context, other fastening possibilities, which appear expedient to a person skilled in the art, between the inner circle guide element 16a and the nozzle element 18a are also conceivable, for example latching connections, screw connections or other interlocking connections.

Figure 2:
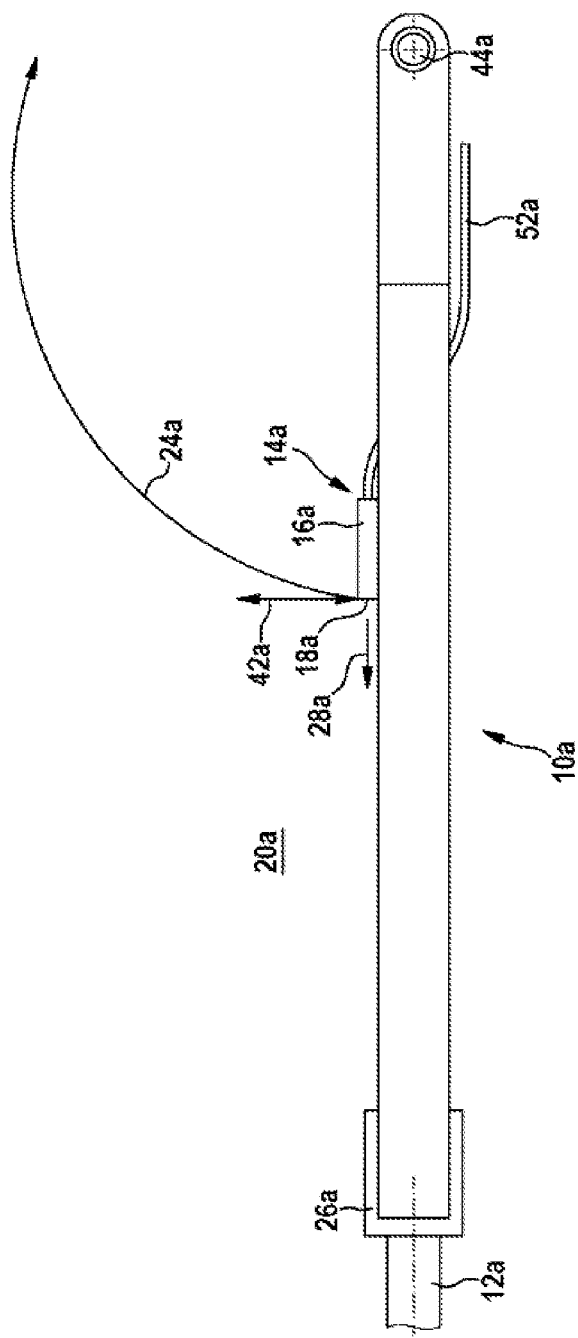
FIG. 2 shows a top view of the wiper device according to FIG. 1.
Figure 4:
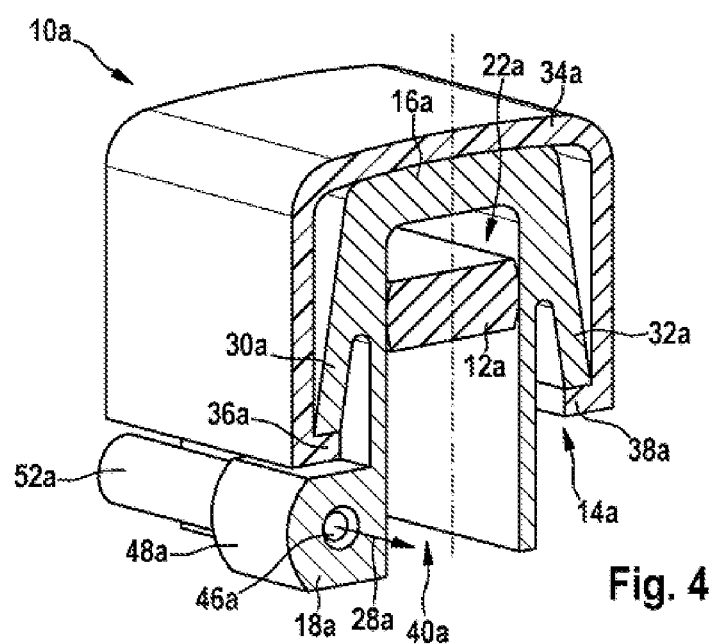
FIG. 4 shows a perspective view of the wiper device according to FIG. 1.

In an operating state, the nozzle element 18a sprays washing water for cleaning the motor vehicle windshield 20a out of a spray opening 46a in a certain spraying direction 28a (FIG. 4). The spraying direction 28a of the nozzle element 18a runs radially here to an inner circular trajectory 24a, which is in the form of an arc of a circle, of the inner circle guide unit 14a (FIG. 2). The inner circular trajectory 24a runs about a rotational center 44a about which the wiper device rotates in an operating state.

The inner circle guide unit 14a guides a free, inner wiper blade end 22a of the wiper blade 12a along the inner circular trajectory 24a of the inner circle guide unit 14a in an operating state. The wiper blade end 22a bears in an interlocking manner against the inner circle guide element 16a of the inner circle guide unit 14a. The wiper blade end 22a is part of a wiping lip. However, it is also conceivable in this context for the wiper blade end 22a to be formed by a cap which ends the wiper blade 12a.

Figure 3:
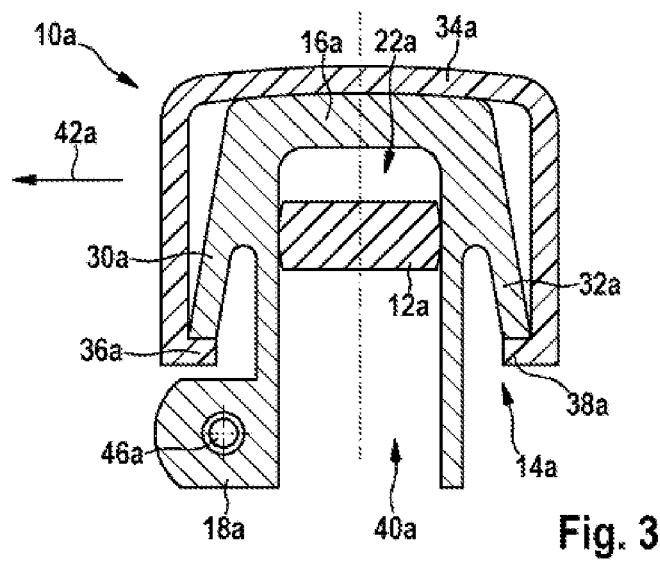
FIG. 3 shows a section through the wiper device according to FIG. 1 along III-III.

As is furthermore shown in FIG. 3, the inner circle guide element 16a couples the free wiper blade end 22a of the wiper blade 12a to the wiper arm 10a. In this case, the inner circle guide element 16a surrounds the wiper blade 12a in an interlocking manner. The inner circle guide unit 14a has two latching means 30a, 32a which form a latching connection with the wiper arm 10a.

The latching means 30a, 32a are of spring-elastic design and, during installation, are deflected elastically out of a starting position and, in a fitted state, automatically move back into the starting position. The latching means 30a, 32a extend from a wiper arm upper side 34a to respective strip-shaped wiper arm edges 36a, 38a.

As is furthermore shown in FIG. 4, the wiper arm edges 36a, 38a are formed in one piece with the wiper arm 10a and point with their free ends in mutually facing directions. The latching means 30a, 32a are supported, in a fitted state, on the wiper arm edges 36a, 38a. In the fitted state, the latching means 30a, 32a are concealed by the wiper arm 10a and are invisible to the outside.

The inner circle guide element 16a has a guide recess 40a which receives the wiper blade end 22a of the wiper blade 12a in an interlocking manner. The nozzle element 18a is arranged behind the guide recess 40a, as viewed in a first wiping direction 42a. In this case, in the event of an airstream occurring, the nozzle element 18a is arranged in a wind shadow of the wiper arm 10a and of the wiper blade 12a. The first wiping direction 42a runs from the inner circle guide unit 14a tangentially to the inner circular trajectory 24a.

Figure 5:
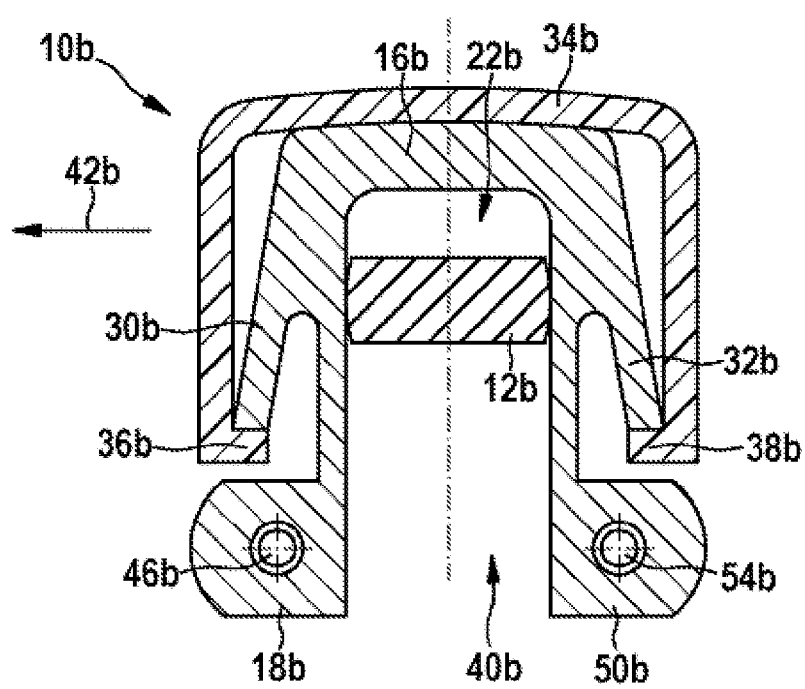
FIG. 5 shows a section through a further exemplary embodiment of a wiper device according to the invention.

FIG. 5 shows a further exemplary embodiment of the invention. The descriptions below are essentially restricted to the differences between the exemplary embodiments, wherein reference can be made in respect of identical components, features and functions to the description of the first exemplary embodiment. In order to differentiate the exemplary embodiments, the letter a in the reference numbers of the exemplary embodiment in FIGS. 1 to 3 is replaced by the letter b in the reference numbers of the exemplary embodiment in FIG. 4. Reference can basically also be made to the drawings and/or to the description of the first exemplary embodiment with regard to components of identical designation, in particular with regard to components having the same reference number.

FIG. 5 shows a section through a further exemplary embodiment of a wiper device according to the invention comprising a wiper arm 10b to which an inner circle guide unit 14b is fastened, and a wiper blade 12b which is guided by an inner circle guide element 16b of the inner circle guide unit 14b. The inner circle guide unit 14b comprises a first nozzle element 18b.

The first nozzle element 18b has a connecting element 48b for the connection of a washing water tube 52b. The connecting element 48b contains a circular connecting recess (not illustrated) in which the first nozzle element 18b is embedded.

The inner circle guide unit 14b comprises a second nozzle element 50b. The second nozzle element 50b is formed in one piece with the inner circle guide element 16b in an injection molding process. Furthermore, the second nozzle element 50b is arranged in front of the guide recess 40b, as viewed in a first wiping direction 42b. In an operating state, the second nozzle element 50b sprays washing water out of a spray opening 54b in a spraying direction which runs parallel to a spraying direction of the first nozzle element 18b.

The invention claimed is:

1. A wiper device comprising a wiper arm (10a; 10b) having a connection end and an intermediate portion supporting an inner circle guide unit (14a; 14b) spaced from the connection end and having an inner circle guide element (16a; 16b) for guiding a wiper blade (12a; 12b), the wiper blade (12a; 12b) having a first end and a second end spaced from the first end along a longitudinal axis of the wiper blade (12a; 12b), characterized in that the wiper blade (12a; 12b) is connected to the connection end of the wiper arm (10a; 10b) at a connection point between the first end and the second end and to the intermediate portion of the wiper arm (10a; 10b), via the inner circle guide unit (14a; 14b), proximate the second end, characterized in that the inner circle guide unit (14a; 14b) is configured to guide the second end of the wiper blade (12a; 12b) along an inner circular trajectory (24a) of the wiper arm (10a; 10b), wherein the inner circle guide unit (14a; 14b) has at least one nozzle element (18a; 18b) for spraying washing liquid onto a motor vehicle windshield (20a), and characterized in that the at least one nozzle element (18a) has a spraying direction (28a) which extends substantially radially to the inner circular trajectory (24a) of the wiper arm (10a; 10b), the arm (10a; 10b) being pivotally mounted for rotation about an axis, wherein the inner circle guide unit (14a; 14b) has at least one latching means (30a, 32a; 30b, 32b) for forming a latching connection with the wiper arm (10a; 10b) and a guide recess (40a; 40b) for receiving the wiper blade (12a; 12b) in an interlocking manner, wherein the wiper arm (10a; 10b), the wiper blade (12a; 12b), the at least one latching means (30a, 32a; 30b, 32b), and the guide recess (40a; 40b) are centered over the longitudinal axis, and wherein the at least one nozzle element (18a; 18b) is below the at least one latching means (30a, 32a; 30b, 32b) relative to the motor vehicle windshield.

2. The wiper device as claimed in claim 1, characterized in that the nozzle element (18a; 18b) is formed in one piece with the inner circle guide element (16a; 16b).

3. The wiper device as claimed in claim 1, characterized in that the nozzle element (18a; 18b) is arranged behind the guide recess (40a; 40b), as viewed in a first wiping direction (42a) such that the nozzle element (18a; 18b) is located in a wind shadow of the wiper arm (10a; 10b) and of the wiper blade (12a; 12b).

4. The wiper device at least as claimed in claim 3, characterized in that the inner circle guide unit (14a; 14b) has at least one second nozzle element (50b).

5. The wiper device as claimed in claim 4, characterized in that the at least one second nozzle element (50b) is arranged in front of the guide recess (40a; 40b), as viewed in the first wiping direction (42a).

6. The wiper device at least as claimed in claim 1, wherein the at least one nozzle element is an at least one first nozzle element, characterized in that the inner circle guide unit (14a; 14b) has at least one second nozzle element (50b).

7. The wiper device as claimed in claim 6, characterized in that the at least one second nozzle element (50b) is arranged in front of the guide recess (40a; 40b), as viewed in a first wiping direction (42a).

8. A system comprising a wiper device as claimed in claim 1 and the wiper blade (12a; 12b) which is guided by the inner circle guide unit (14a; 14b).

9. The wiper device as claimed in claim 1, characterized in that the at least one nozzle element (18a; 18b) is disposed laterally adjacent to the guide recess for receiving the wiper blade in an interlocking manner.

10. The wiper device as claimed in claim 1, characterized in that a tube (52a) that conveys the washing liquid is fastened to the nozzle element (18a), the tube terminating at the inner circle guide element (16a; 16b).

11. The wiper device as claimed in claim 1, characterized in that the inner circular trajectory (24a) runs about a rotational center (44a) about which the wiper device rotates.

12. A wiper device comprising a wiper arm (10a; 10b) having a connection end and an intermediate portion supporting an inner circle guide unit (14a; 14b) spaced from the connection end and having an inner circle guide element (16a; 16b) for guiding a wiper blade (12a; 12b) having a first end and a second end spaced from the first end along a longitudinal axis of the wiper blade (12a; 12b), characterized in that that the wiper blade (12a; 12b) is connected to the connection end of the wiper arm (10a; 10b) at a connection point between the first end and the second end and to the intermediate portion of the wiper arm (10a; 10b), via the inner circle guide unit (14a; 14b), proximate the second end, wherein the inner circle guide unit (14a; 14b) is configured to guide the second end of the wiper blade (12a; 12b) along an inner circular trajectory (24a) of the wiper arm (10a; 10b), wherein the inner circle guide unit (14a; 14b) has at least one nozzle element (18a; 18b) for spraying washing liquid onto a motor vehicle windshield (20a), wherein the inner circle guide unit has a first and second latching means for forming a latching connection with the wiper arm and a guide recess (40a; 40b) for receiving the wiper blade (12a; 12b) in an interlocking manner, wherein the guide recess is arranged laterally between the first latching means and the second latching means, wherein the at least one nozzle element is below the first and second latching means relative to the motor vehicle windshield, wherein the nozzle element (18a) has a spraying direction (28a) which extends substantially parallel to the longitudinal axis of the wiper arm (10a; 10b), the arm (10a; 10b) being pivotally mounted for rotation about an axis, and wherein the wiper arm (10a; 10b), the wiper blade (12a; 12b), the first and second latching means (30a, 32a; 30b, 32b), and the guide recess (40a; 40b) are centered over the longitudinal axis.

13. The wiper device as claimed in claim 12, characterized in that the at least one nozzle element (18a; 18b) is formed in one piece with the inner circle guide element (16a; 16b).

14. The wiper device at least as claimed in claim 12, wherein the at least one nozzle element is an at least one first nozzle element, characterized in that the inner circle guide unit (14a; 14b) has at least one second nozzle element (50b).

15. The wiper device as claimed in claim 12, characterized in that the nozzle element (18a; 18b) is arranged behind the guide recess (40a; 40b) of the inner circle guide element (16a; 16b), as viewed in a first wiping direction (42a) such that the nozzle element (18a; 18b) is located in a wind shadow of the wiper arm (10a; 10b) and of the wiper blade (12a; 12b).

16. The wiper device as claimed in claim 12, characterized in that the at least one nozzle element (18a; 18b) is disposed laterally adjacent to the guide recess for receiving the wiper blade in an interlocking manner.

17. The wiper device as claimed in claim 12, characterized in that a tube (52a) that conveys the washing liquid is fastened to the nozzle element (18a), the tube terminating at the inner circle guide element (16a; 16b).

18. The wiper device as claimed in claim 12, characterized in that the inner circular trajectory (24a) runs about a rotational center (44a) about which the wiper device rotates.

* * * * *